United States Patent [19]
Meredith et al.

[11] Patent Number: 5,913,177
[45] Date of Patent: Jun. 15, 1999

[54] TRAFFIC DISTRIBUTION ANALYSIS IN A LAND MOBILE RADIO SYSTEM

[75] Inventors: Sheldon Kent Meredith; David A. Dye, both of Phoenix, Ariz.

[73] Assignee: Radio Frequency Systems, Inc., Marlboro, N.J.

[21] Appl. No.: 08/829,682

[22] Filed: Mar. 31, 1997

[51] Int. Cl.$^6$ .............................. H04B 1/38; H04M 1/00
[52] U.S. Cl. .................. 455/562; 455/67.1; 455/272; 455/450
[58] Field of Search ................................ 455/561, 562, 455/272, 277.1, 277.2, 67.1, 450, 453, 423, 424, 422, 11.1

[56] References Cited

U.S. PATENT DOCUMENTS

| | | | |
|---|---|---|---|
| 4,670,899 | 6/1987 | Brody et al. | 455/453 |
| 4,866,710 | 9/1989 | Schaeffer | 455/453 |
| 5,084,869 | 1/1992 | Russell | 455/561 |
| 5,175,878 | 12/1992 | Davis et al. | 455/277.1 |
| 5,239,541 | 8/1993 | Murai | 455/277.2 |
| 5,276,907 | 1/1994 | Meidan | 455/453 |
| 5,446,922 | 8/1995 | Siwiak et al. | 455/277.2 |
| 5,570,343 | 10/1996 | Bishop et al. | 370/16 |
| 5,691,729 | 11/1997 | Gutman et al. | 455/277.2 |
| 5,740,526 | 4/1998 | Bonta et al. | 455/272 |
| 5,742,911 | 4/1998 | Dumbrill et al. | 455/562 |
| 5,745,841 | 4/1998 | Reudink et al. | 455/67.1 |
| 5,758,287 | 5/1998 | Lee et al. | 455/450 |
| 5,794,140 | 8/1998 | Sawyer | 455/453 |

FOREIGN PATENT DOCUMENTS

| | | |
|---|---|---|
| 9638011 | 11/1996 | WIPO |
| 9731501 | 8/1997 | WIPO |

*Primary Examiner*—Dwayne D. Bost
*Assistant Examiner*—Quochien B. Vuong
*Attorney, Agent, or Firm*—Ware, Fressola, Van Der Sluys & Adolphson LLP

[57] ABSTRACT

In a system for interconnecting a plurality of radio channel units in a single trunk group with a plurality of directional antennas and/or antenna beams, each radio channel unit has a receive section and a transmit section and the system dynamically connects the receive and transmit sections of each one of the radio channel units with any one of the plurality of antennas which, on average during a sampling period, is best suited for receiving and transmitting RF signals at the operating frequency of the radio channel unit. The system further includes traffic distribution monitor for monitoring, storing and displaying information on a periodic basis indicative of the usage of each antenna and/or antenna beam. The specific antenna or antenna beam being utilized by a radio channel unit is monitored on a periodic basis during communications between the radio channel unit and a mobile radio unit, and this information is stored in a memory associated with the radio channel unit.

13 Claims, 7 Drawing Sheets

TRAFFIC DISTRIBUTION ANALYSIS IN A LAND MOBILE RADIO SYSTEM

TECHNICAL FIELD

The present invention is directed to a land mobile radio system, such as a mobile cellular telephone system, personal communications network (PCN), or other high frequency system, and more particularly, to improved analysis of traffic distribution in a land mobile radio base site of the land mobile radio system.

BACKGROUND OF THE INVENTION

In a typical land mobile radio system, such as a mobile cellular telephone system or personal communications network (PCN), a plurality of cells are defined which make up the system. Each cell is a geographically defined area wherein communications are handled by a land mobile radio base site (cell site) for mobile units operating within the boundaries of the cell. Although these cells are often represented as hexagons in cell design schemes, in reality, due to terrain and the presence of buildings and other structures, the actual boundary of a cell may have an irregular shape.

As is well known in the art, cell layouts are typically characterized by a frequency reuse pattern where a number of different frequency sets are defined. Each cell uses a particular frequency set, and the cell layout is designed to provide the maximum separation between cells using the same frequency set so as to minimize interference.

It is generally required, depending on the location of the cell site within a cell, that the cell site antennas provide coverage for communications over 360° of azimuth in order to effectively cover the corresponding geographic area. In existing base sites, either omni-directional antennas or panel antennas are used to provide the 360° of azimuth. If panel antennas are used, the 360° of azimuth is divided into a number of smaller sectors, such as three sectors, with each sector provided with a pair of antennas each having a beamwidth of 120°.

Usage monitoring in a base site is important to the operator of a base site because it provides important information regarding the utilization of the resources at the base site during communications between mobil radios and the base site (call traffic or traffic). In base sites such as those described above using omni-directional antennas or panel antennas usage monitoring is typically performed on a per-channel basis. More particularly, the operator of the base site is typically provided with usage information indicative of the amount (duration) that each channel is used during a specified time period. Therefore, the operator of the base site is provided information regarding the usage of each radio channel unit in the base site. However, in such systems the operator is unable to monitor usage based upon the physical location of a mobile unit with respect to the base site.

Recently, base sites have been developed having a sectorized antenna configuration wherein a large number of directional antennas or antennas having a large number of directional beams are employed. In such systems, it would be desirable to provide more useful information to the operator of the base site. In particular, it would be desirable to provide the base site operator with information indicative of the azimuthal distribution of communications with respect to the base site.

SUMMARY OF THE INVENTION

An object of the invention is improved monitoring and display of traffic distribution information in a land mobile radio base site of a land mobile radio telephone system.

Another object of the present invention is to provide such improved monitoring and display of traffic distribution information which specifically provides an indication of traffic distribution in specific azimuthal directions with respect to the land mobile radio base site.

According to the present invention, in a system for interconnecting a plurality of radio channel units in a single trunk group with a plurality of directional antennas and/or antenna beams, each radio channel unit having a receive section and a transmit section and the system dynamically connecting the receive and transmit sections of each one of the radio channel units with any one of the plurality of antennas which, on average during a sampling period, is best suited for receiving and transmitting RF signals at the operating frequency of the radio channel unit, the system further including traffic distribution monitoring means for monitoring, storing and displaying information on a periodic basis indicative of the usage of each antenna and/or antenna beam.

According further to the present invention, the specific antenna or antenna beam being utilized by a radio channel unit is monitored on a periodic basis during communications between the radio channel unit and a mobile radio unit, and this information is stored in a memory associated with the radio channel unit.

According still further to the present invention, the traffic distribution monitoring means is responsive to a transmit detect signal provided by a transmit switch connected to the radio channel unit for determining that the radio channel unit is communicating with a mobile radio unit, and in response to the transmit detect signal, information is stored in the memory associated with the radio channel unit.

In further accord with the present invention, a supervisory controller is provided for storing traffic distribution information for each of the antennas or antenna beams and for all of the radio channel units. Means are provided for printing and displaying the traffic distribution information for the base site.

According further to the present invention, the traffic distribution information may be used in a base site for determining the position of a transmit switch when an associated radio channel unit is not communicating with a mobile radio unit, the transmit switch position being determined based upon the azimuthal direction having the greatest amount of usage for the particular radio channel unit.

The present invention provides a significant improvement over the prior art by providing improved identification of azimuthal traffic distribution at a cellular base site. This information may be used by the base site operator for improved management of a cellular base site and to aid in selecting the location of future cellular base sites. The invention provide for the automatic monitoring of all call traffic per antenna, per channel over a selected monitoring interval. The information is therefore used for the storage and display of information based on an azimuthal distribution as opposed to a "per channel" usage monitoring as done in the prior art. Usage data monitoring, storage and display are therefore performed for an entire trunk group of channels on an azimuthal traffic distribution basis rather than for individual channels.

The foregoing and other objects, features and advantages of the present invention will become more apparent in light of the following detailed description of exemplary embodiments thereof, in view of the accompanying drawings.

DETAILED DESCRIPTION OF THE INVENTION

Figure 1:
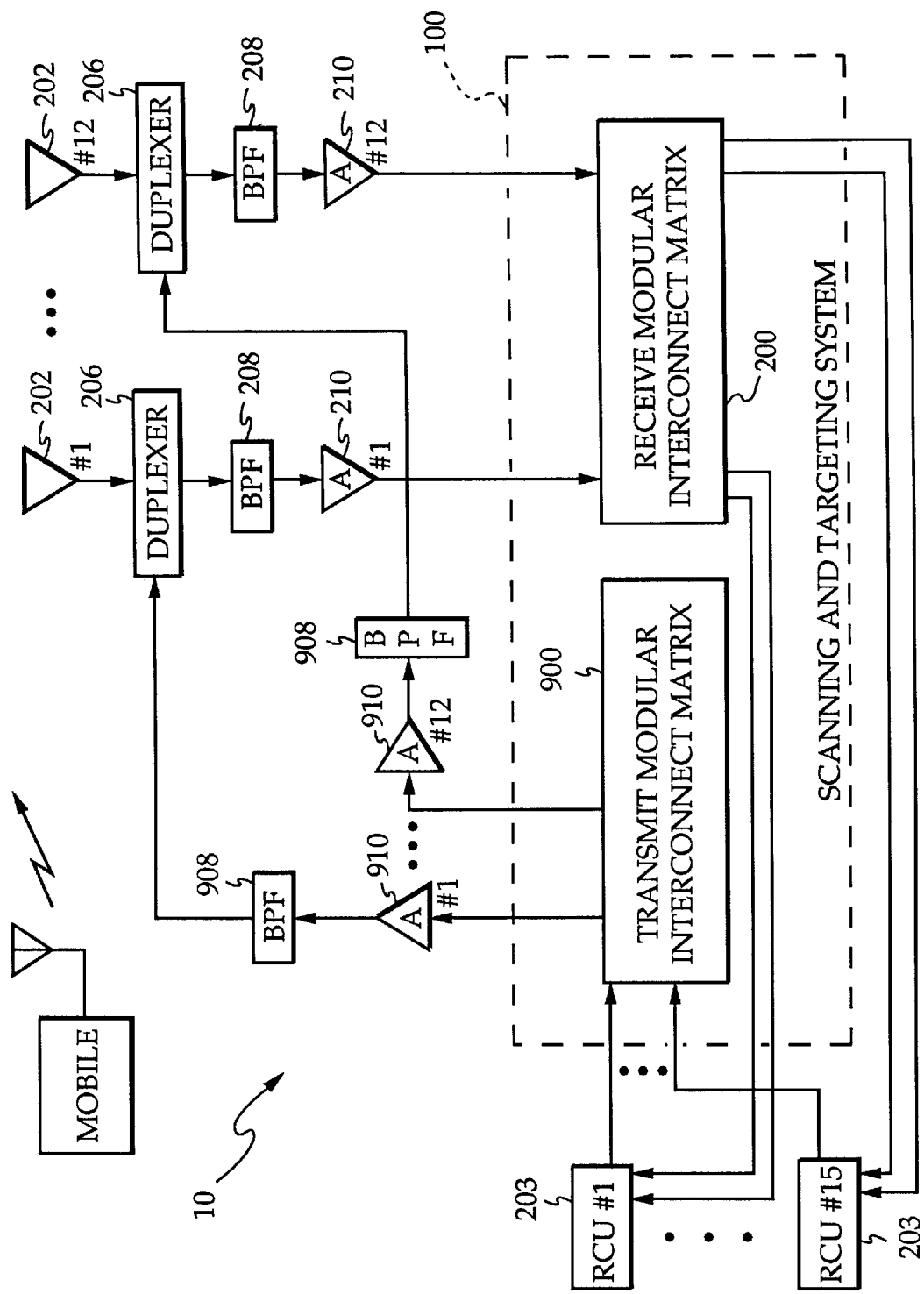
FIG. 1 is a schematic block diagram of a land mobile radio base site having the modular radio signal scanning and targeting system of the present invention.

Referring to FIG. 1, a land mobile radio system base site 10 includes a modular radio signal scanning and targeting system 100. The system 100 is used to dynamically interconnect a plurality (N) of antenna 202 with a plurality (M) of radio channel units (RCU) 203. The radio channel units 203 are transceivers having a transmit section and a receive section. The receive section is typically a diversity receiver having two diversity inputs, e.g., diversity 1 and diversity 2, capable of receiving RF signals from two different sources and selecting the strongest of the two. The scanning and targeting system 100 dynamically connects the receive section of each one of the radio channel units 203 with any two of the antennas 202 which, on average during a sampling period, has the strongest received signal strength of RF signals at the operating frequency of the radio channel unit 203. The antenna having the strongest received RF signal strength is connected to the RCU diversity 1 input and the antenna having the second strongest received RF signal strength is connected to the RCU diversity 2 input. Additionally, the scanning and targeting system 100 dynamically connects the transmit section of each one of the plurality of radio channel units with any one of the plurality of antennas which, on average during a sampling period, is best suited for transmitting RF signals at the operating frequency of the one radio channel unit in a direction corresponding to the desired destination for the transmitted RF signals. A scanning and targeting system of the above-described type is described in commonly owned, copending patent application Ser. No. 08/708,130 filed on Jul. 26, 1996, the disclosure of which is incorporated herein by reference.

An embodiment of the invention is described herein as being used with 12 different narrow-beamwidth antennas 202 for the transmission and receipt of RF signals. These narrow-beamwidth antennas provide the significant benefit of improved signal quality, primarily due to reduced interference. However, it will be understood by those skilled in the art that a variety of different antenna configurations may be used with the invention. The antennas can be though of as separate signal ports for interconnection with transceivers. As an alternative to 12 physically different narrow-beamwidth antennas, each antenna 202 may actually be a particular beam of a multi-beam phase array antenna system, wherein arrays of co-linear radiating elements form each phase array antenna, with the arrays driven by a phase array feed network, so as to generate a plurality of beams or lobes, each of which acts as a separate signal port for the reception or transmission of radio frequency energy in a particular azimuthal direction. Additionally, although 12 antenna beams are shown, different numbers of antennas or antenna beams may be used in different system configurations. In another embodiment of the invention, 16 antenna beams of a multi-beam phase array antenna are used. However, regardless of the number of antennas or antenna beams used, the present invention is equally well understood as described herein with respect to a base site having 12 different antennas or antenna beams.

The antennas 202 are used for the transmission and receipt of RF signals, and a duplexer 206 of a type known in the art is provided for each antenna 202, for controlling each antenna to either transmit or receive RF signals at any one time.

Figure 2:
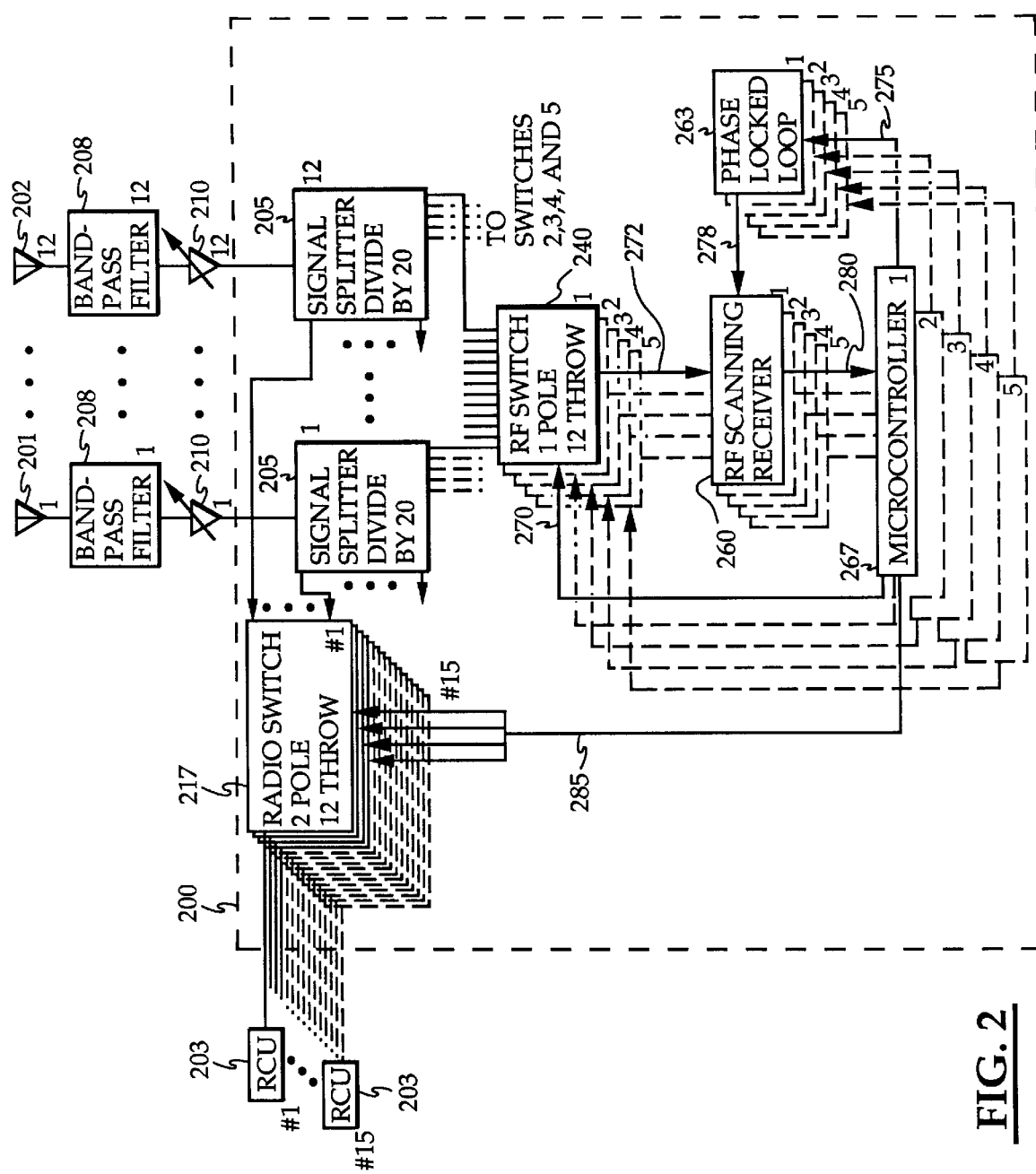
FIG. 2 is a schematic block diagram of a receive modular interconnect matrix of the system of FIG. 1.

Referring also to FIG. 2, the system 100 includes a receive modular interconnect matrix 200, i.e., a modular interconnect matrix which is used to provide signals received on antennas 202 to receive terminals (diversity inputs) mounted on the radio channel units 203. The receive modular interconnect matrix 200 comprises a plurality (N) of signal splitter modules 205, one signal splitter module 205 being associated with each of the antennas 202. Each antenna 202 is connected to its associated signal splitter modules 205 via a duplexer 206, a band pass filter 208, and an adjustable preamplifier 210 which amplifies the received signals before being provided to the signal splitters 205. In FIG. 2, twelve (12) antennas 202 are shown interconnected to twelve (12) signal splitter modules 205. The signal splitter modules 205 are power dividers which divide the amplified RF signals into a plurality (X) of equal parts, e.g., each of the equal parts has an identical signal characteristic (shape) as the amplified RF signal at a fraction (1/X) of the signal strength. For example, a 20-way power divider having a frequency range of 824 to 894 MHZ and an insertion loss of 16 dB may be selected for use as a signal splitter. Each signal splitter module 205 divides the received RF signal into 20 equal power parts.

The receive modular interconnect matrix 200 also comprises a plurality (M) of first switching modules (radio switches) 217. There is one radio switch 217 associated with each radio channel unit 203. Each of the radio switches 217 is interconnected with a pair of receiver connectors (the diversity 1 and diversity 2 inputs) on the corresponding radio channel unit 203. Each radio switch 217 also comprises a plurality of connectors each for interconnection with a corresponding one of the signal splitters 205. Each radio switch 217 includes a 2-pole-N-throw switch which operates under control of control signals provided by a micro-controller 267, which is described in greater detail herein after, for connecting each RCU diversity input with an antenna via the signal splitters 205. The two-pole-N-throw switch may be a two-pole-twelve-throw electronic switch manufactured by the Celwave Division of Radio Frequency Systems, Inc., which is powered by a 15 VDC power supply and is controlled by a pulse width modulated data stream containing both timing (clock) data and control (switching) data.

Using the above described arrangement, each one of the radio switches 217 is provided with a portion (1X) of the RF signal output of each antenna 202 due to the matrix interconnection of the radio switches 217 with the signal splitter modules 205. Therefore, depending on the position of the 2-pole-N-throw switch within the switch module 217, each radio channel unit may be interconnected to any two antennas via its associated switching module 217 and the two signal splitters 205 associated with the two antennas.

A plurality (Y) of control group switches 240 are also provided for interconnection with the signal splitter modules 205. Each control group switch 240 includes a one-pole-N-throw switch which operated under control of control signals provided by the micro controller 267. The one-pole-N-throw switch may be a one-pole-twelve-throw electronic switch manufactured by the Celwave Division of Radio Frequency Systems, Inc., which is powered by a 15 VDC power supply and is controlled by a pulse width modulated data stream containing both timing (clock) data and control (switching) data.

Each control group switch 240 is connected between each of the signal splitters 205 and a corresponding RF scanning receiver 260. Associated with each RF scanning receiver 260 is a phase locked loop (PLL) device 263 and a micro-controller 267, e.g., a HC11F1 (MCU) manufactured by Motorola. A more detailed description of the construction and operation of the receive modular interconnect matrix 200 can be found in commonly owned, copending patent application Ser. No. 08/708,130 filed on Jul. 26, 1996, the disclosure of which is incorporated herein by reference.

Associated with a number of radio channel units, for example 3 radio channel unites, is a control group in which one of the micro-controllers 267 controls a corresponding phase locked loop 263, RF scanning receiver, control group switch 240, and three radio switches 217. Each radio channel unit 203 transmits and receives RF signals on an assigned (operating) frequency, and the phase locked loop 263 is configured to control the receiving frequency of the RF scanning receiver for sequentially receiving RF signals at three different frequencies, each of the three frequencies corresponding to the operating frequencies of the three radio channel units in its corresponding group. Under control of the micro-controller 267, the control group switch 240 selects one of the twelve antennas 202. The signals provided by the antenna 202 are provided via the band pass filter 208 to the adjustable amplifier 210 where the received signals are amplified. Next the received signal is provided to the corresponding signal splitter module 205 where the signal is divided into 20 equal power parts. One of the equal power parts is provided to each of the control group switches 240.

A control signal is provided on a line 270 from the micro-controller 267 to the control group switch 240 for controlling the position of the one-pole-twelve-throw switch of the control group switch 240 for antenna selection. The part of the amplified RF signal from the selected antenna is provided via the control group switch 240 to a line 272 which is connected to the RF scanning receiver 260. The micro-controller also provides control signals on a line 275 to the phase locked loop 263 to control the phase locked loop to in turn control the receiving frequency of RF scanning receiver 260 so as to sequentially receive RF signals at the three different frequencies corresponding to the three radio channel units within the corresponding group. Control signals are provided by the phase locked loop to the RF scanning receiver 260 on a line 278. First, the RF scanning receiver 260 measures the power level of the RF signal on the line 272 at the first frequency under control of the phase locked loop. The RF scanning receiver provides a signal on a line 280 to the micro-controller 267 indicative of the power level of the signal on the line 272 at the first frequency. After measurements are taken on one antenna, the micro-controller provides a control signal on the line 270 to the control group switch 240 for selection of the next antenna 202. The signal provided by the next antenna 202 is then measured at the first frequency and the measurements is recorded by the micro-controller 267. This procedure is repeated for all antennas 202.

After measurements are taken on all of the antennas at the first frequency, the micro-controller 267 provides a control signal on the line 275 to the phase locked loop 263, which in turn controls the RF scanning receiver 260 to receive RF signals at the second frequency. The RF scanning receiver then provides a second measurement of the power level of the received signal at the second excitation frequency on the line 280 to the micro-controller 267. The micro-controller then provides a control signal on the line 270 to the control group switch 240 for selection of the remaining antennas 202 so that a measurement is taken on each antenna at the second frequency. This procedure is repeated for the third frequency corresponding to the third RCU in the group.

Each antenna 202 is sampled at all three frequencies approximately 8 to 16 times per second, depending of the sampling speed as controlled by the micro-controller 267. The micro-controller 267 maintains a running average of the received signal strength at the three radio channel unit operating frequencies for all twelve antennas, and provides a control signal on a line 285 to each of the radio switches 217 in the corresponding group indicative of the two selected antennas having the strongest signal strength at the operating frequency of the corresponding radio channel unit. The two-pole-twelve-throw switch in the radio switch 217 connects the two diversity inputs to the two selected antennas in response to the control signal on the line 285 from the micro-controller 267. As is known in the art, the radio channel unit diversity amplifier then selects between the two input signals for providing an input to the receiver.

Figure 3:
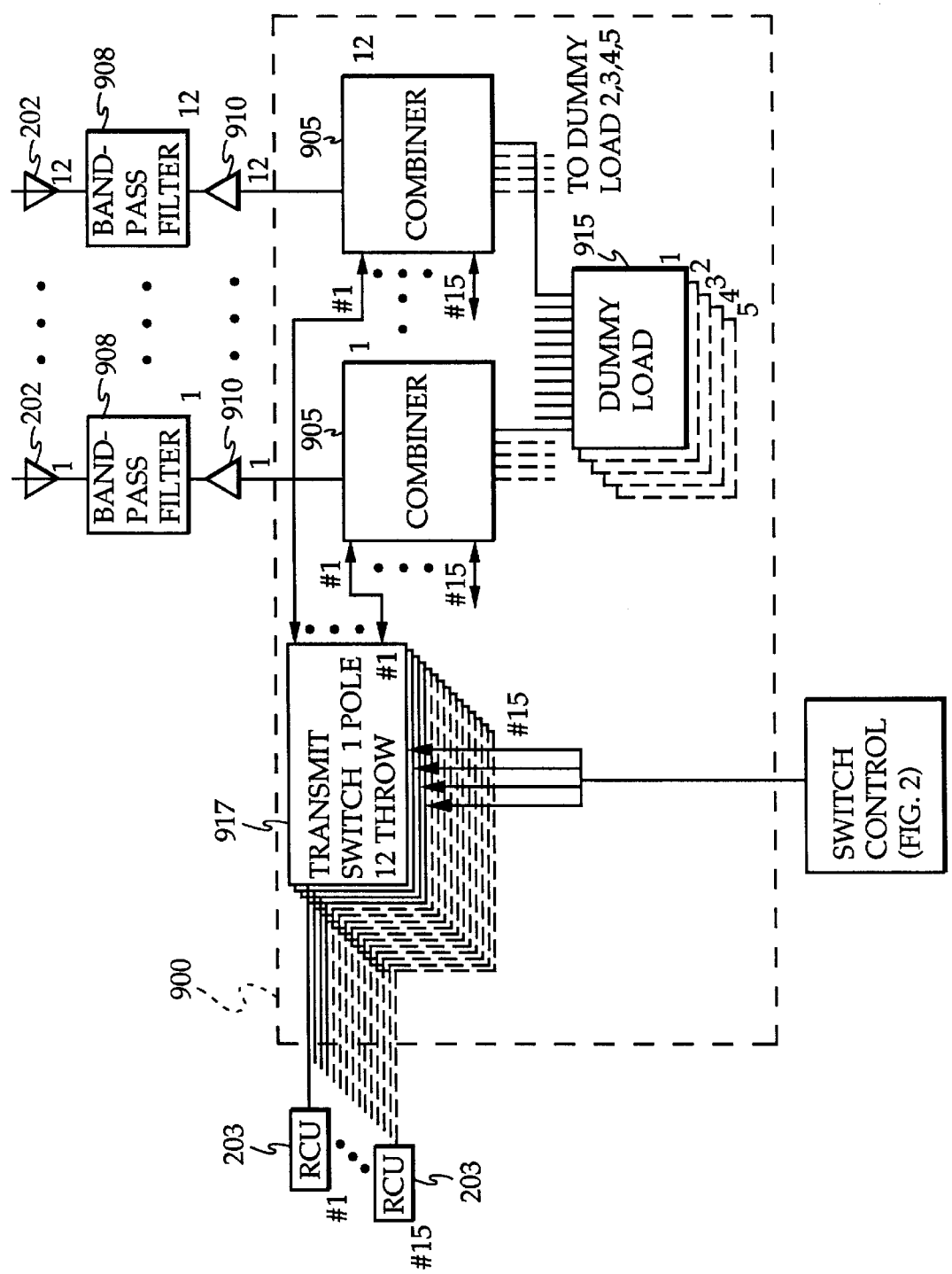
FIG. 3 is a schematic block diagram of a transmit modular interconnect matrix of the system of FIG. 1.

Referring again to FIG. 1, the system 100 also comprises a transmit modular interconnect matrix 900 used to interconnect a plurality of radio channel units 203 with a plurality of antennas 202 for the transmission of signals provided by the radio channel units 203 via the antennas 202. Referring also to FIG. 3, the transmit modular interconnect matrix 900 is similar to the receive modular interconnect matrix 200 except that it includes a transmit switch 917 interconnected to a transmit terminal of each radio channel unit 203 (instead of a radio switch). Additionally, the signal splitter modules 205 (FIG. 2) are replaced with combiner modules 905 which combine RF signals provided by the various radio channel units into a combined RF signal which is provided from each combiner module 905 via an amplifier 910 and filter 908 to an antenna 202 for transmission. For purposes of controlling the transmit modular interconnect matrix 900, it is assumed that the antenna 202 indicated as having the strongest received signal strength at the operating frequency of the radio channel unit 203 is the best antenna for transmission of signals provided by the radio channel unit 203, and therefore, a control group switch and corresponding scanning receiver, phase locked loop, and micro-controller are not required in the transmit modular interconnect matrix 900. Instead, each transmit switch of the transmit modular interconnect matrix 900 is controlled to interconnect the transmit terminal of the radio channel unit with the antenna having the strongest signal strength at the operating frequency of the corresponding radio channel unit. Additionally, since the control group switches are not required in the transmit modular interconnect matrix 900, the combiner modules 905 may be configured for connection with dummy loads 915 mounted to the combiner connectors which are not used. Alternatively, each combiner module 905 may be provided with only enough connectors for interconnection with the transmit switches.

Figure 4:
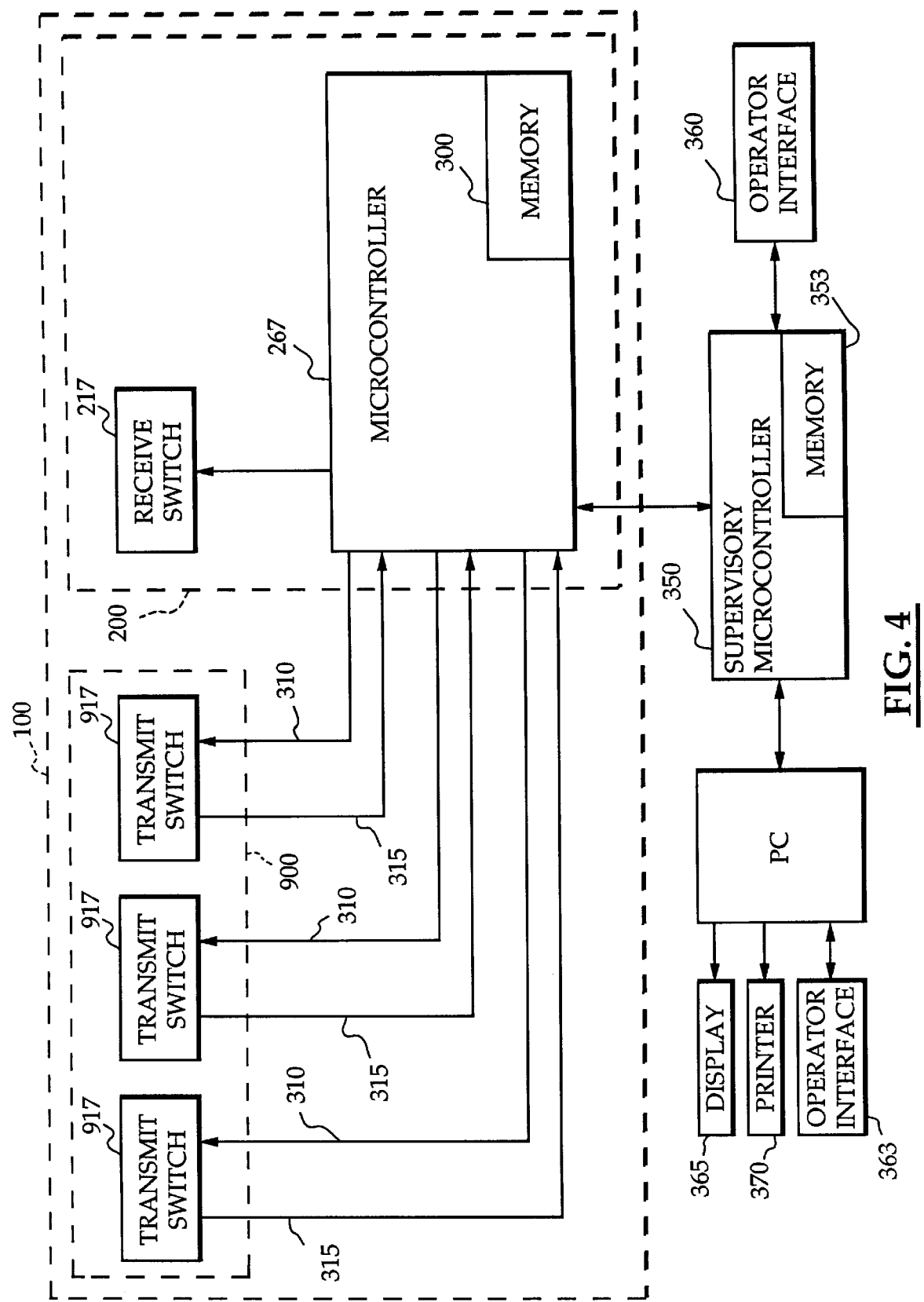
FIG. 4 is a more detailed schematic block diagram of the scanning and targeting system of FIG. 1, showing the traffic distribution monitoring means of the invention.

The traffic distribution analysis of the present invention interacts with both the receive modular interconnect matrix 200 and the transmit modular interconnect matrix 900 for monitoring, storage and display of traffic distribution information in the land mobile radio base site. Referring to FIG. 4, the micro-controller 267 includes a memory 300 for storing data indicative of traffic distribution information. During communications between a mobile unit and the base site, after communications have been established, each radio channel unit continuously transmits a carrier frequency modulated by a supervisory audio tone which is received by the mobile unit. The communications may be established between the mobile unit and the base site in a number of ways, for example as described in commonly owned copending Patent Application Serial No. (Ware, Fressola, Van Der Sluys & Adolphson Docket No. 916-080) filed on even date herewith, the disclosure of which is incorporated by reference. This supervisory audio tone is provided by the radio channel unit via the transmit switch 917, combiner, amplifier, bandpass filter for transmission via the antenna 202. As described above, the particular antenna which is utilized to transmit the supervisory audio tone and other communications from the radio channel unit to the mobile unit is determined by the transmit switch 917 under control of control signals provided on the line 310 from the micro-controller 267. The selected antenna corresponds to the antenna indicated as having the strongest signal strength of receive signals at the operating frequency of the radio channel unit.

Each transmit switch 917 is responsive to an RF signal being provided by its corresponding radio channel unit for providing a transmit detect signal on the line 315 to the micro-controller 267. The transmit detect signal indicates that the corresponding radio channel unit is communicating (transmitting an RF signal) via the selected antenna. The micro-controller 267 is responsive to the presence of a transmit detect signal on the line 315 from each transmit switch for storing traffic distribution information in the memory 300. As discussed above, the micro-controller determines the antenna having the strongest signal strength of receive signals at the operating frequency of each radio channel unit. In response to the presence of the transmit detect signal on the line 315, the micro-controller stores information in the memory indicative of the particular radio channel unit for which the transmit detect signal is present and the corresponding antenna having the strongest receive signal strength of RF signals at the operating frequency of the particular radio channel unit. This information is updated on a periodic update frequency as long as the transmit detect signal is present. For example, the information stored in the memory may be updated every 16.5 milliseconds provided that a transmit detect signal is provided on the line 315 from the corresponding transmit switch 917 to the micro-controller 267.

As discussed above, a number of radio channel units are associated in a control group with each micro-controller 267. In the example of FIG. 4, there are three radio channel units associated with the micro-controller 267. Therefore, the memory 300 stores traffic distribution information associated with the three radio channel units. In this case, the memory may be set up as a matrix of information with the size of the matrix corresponding to the number of radio channel units in the control group and the number of antennas at the base site. In the present example with three radio channel units in the control group and the base site having 12 antennas, the memory may be set up as a 3×12 matrix. Information is stored in the memory matrix over a selected time period such as an hour, indicative of the usage of a particular radio channel unit on a particular antenna beam during the time period. Therefore, the information stored in the memory 300 of the micro-controller 267 is indicative of the amount of time that each radio channel unit was communicating on a particular antenna (antenna beam) during the selected time period. The information stored in each of the micro-controllers 267 for each control group may be downloaded at the end of each sampling period, for example at the end of each hour, to a supervisory micro-controller 350 to thereby provide the operator of the base site with information indicative of traffic distribution information for all of the radio channel units and all of the antenna beams. Because each antenna or antenna beam is directed in a specific azimuthal direction, this traffic distribution information may be categorized based on the azimuthal direction of a mobile radio unit with respect to the base site.

The supervisory micro-controller 350 may be provided with an operator interface 360 so that the operator of the cellular base site can select the specific traffic distribution information for monitoring, display and printing. The supervisory micro-controller may also be interconnected via a computer (PC) with a remote operator interface 363, a visual display 365 for viewing by the operator of the base site, and a printer 370 for printing a hard copy report indicative of the traffic distribution information. The supervisory micro-controller includes a memory 353 for storing the traffic distribution information retrieved from each of the micro-controllers 267. The supervisory micro-controller can store the same detailed data stored in each micro-controller 267, for example the specific usage of each antenna per channel during the sampling period. Alternatively, the supervisory micro-controller may simply accumulate all of the data for each of the channels to provide an indication of the total usage per antenna of the base site.

Figure 5:
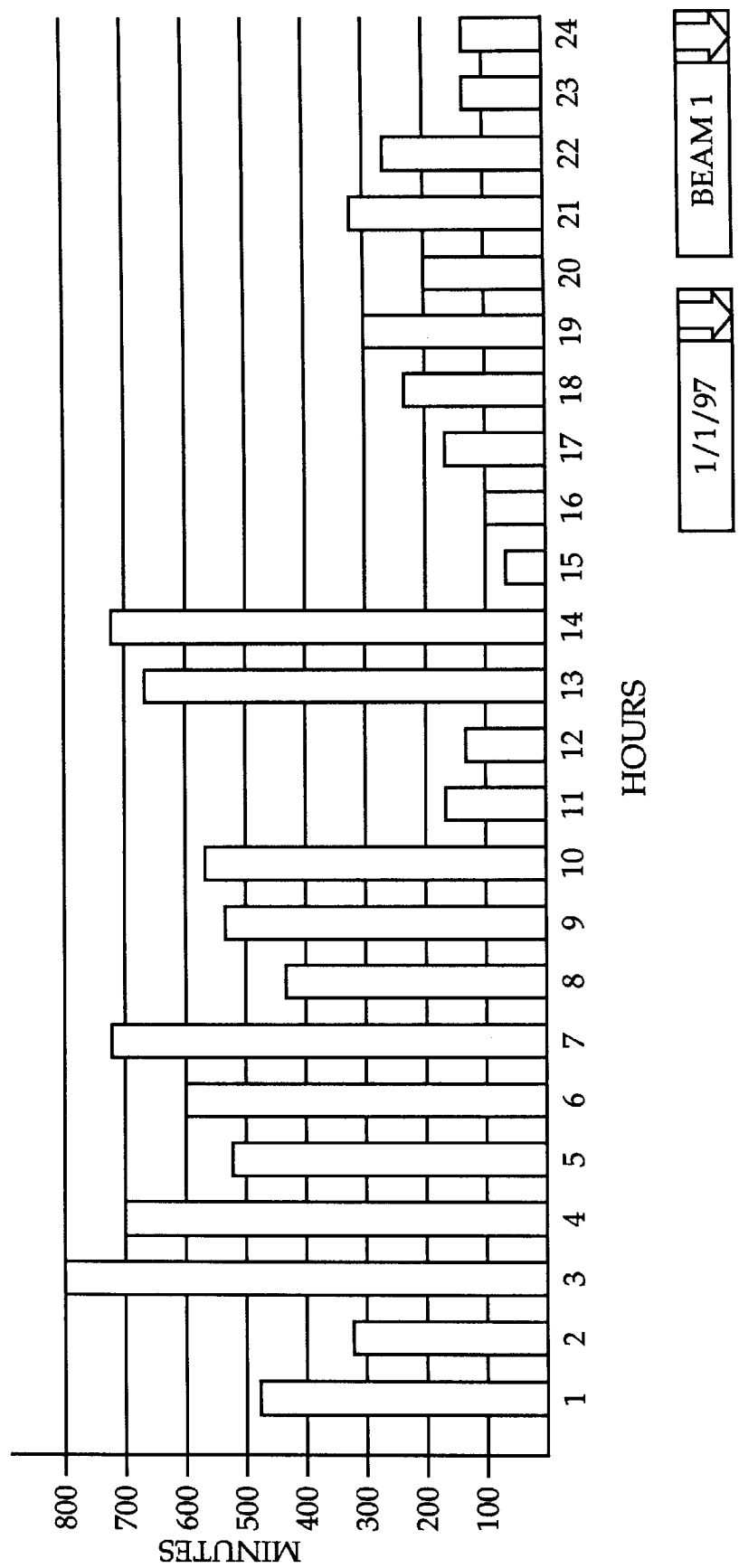
FIGS. 5–7 are illustrations of various information displays which may be provided by the traffic distribution monitoring means of FIG. 4.
Figure 6:
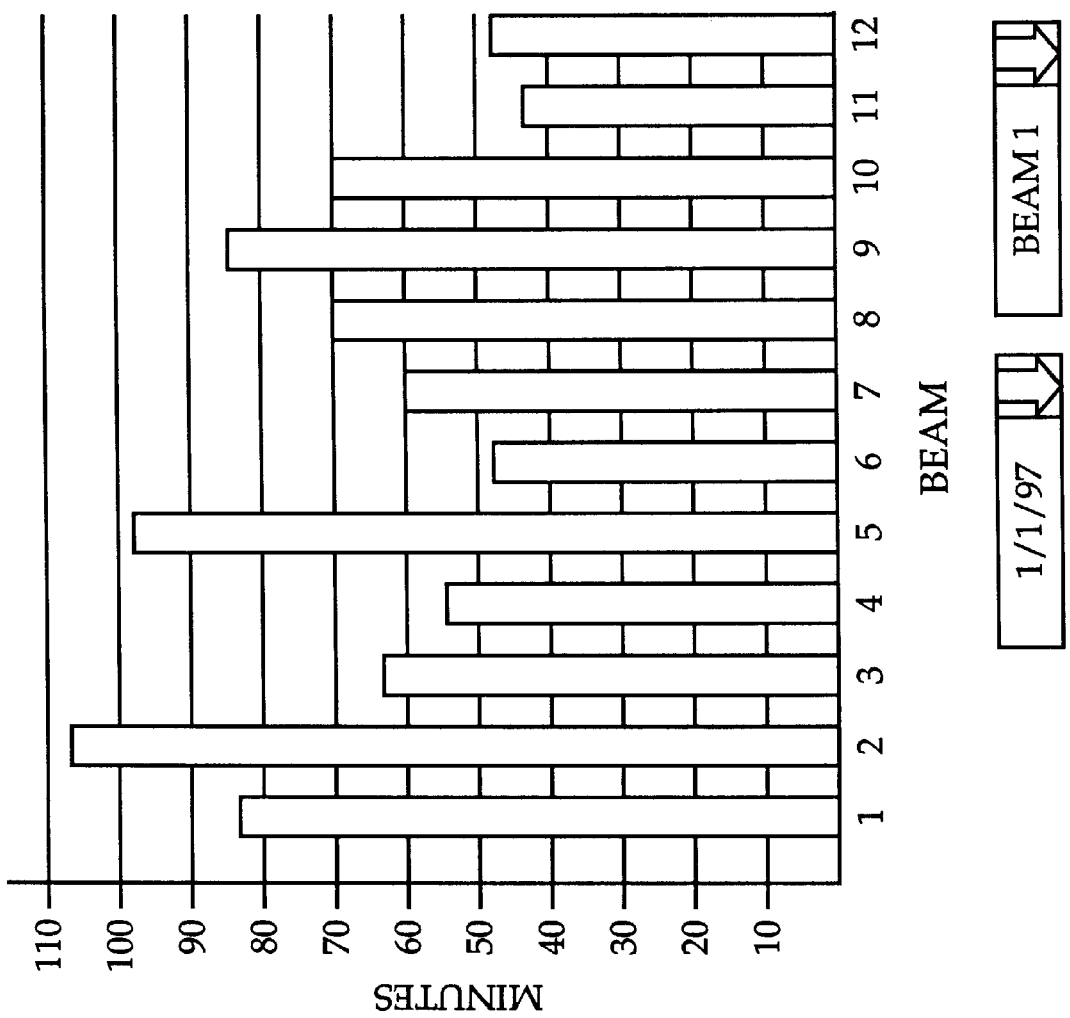
Figure 7:
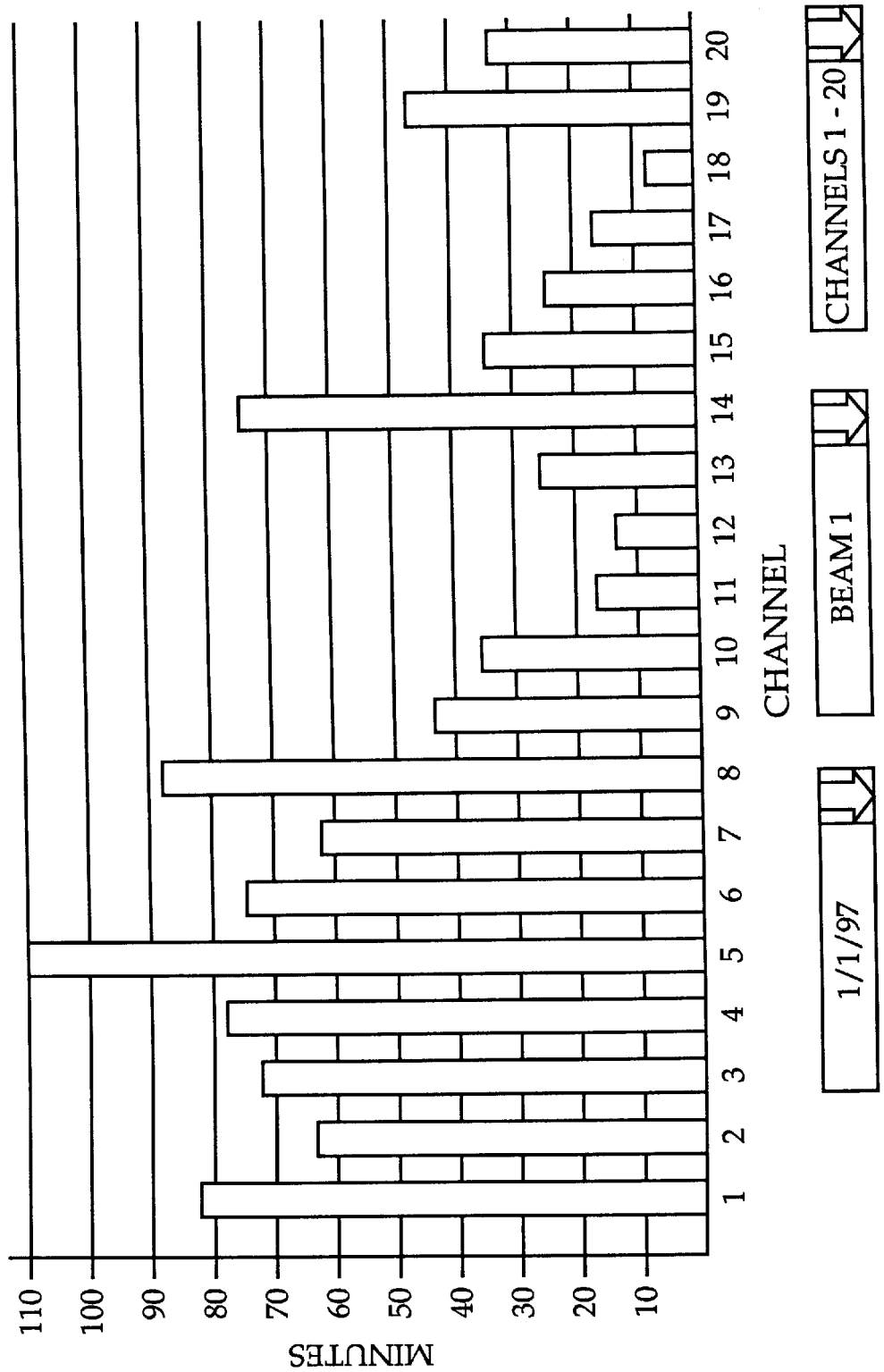

Examples of the various data displays which can be obtained from the supervisory micro-controller for display or printing are illustrated in FIGS. 5–7. Referring to FIG. 5 a first display illustrates the usage of beam 1 during a 24-hour period by all of the radio channel units. This display can be used by the operator of the base site to determine the call usage or traffic distribution during a typical 24-hour period for each beam. For example, in a metropolitan area, the operator may find that certain beams have higher usage during morning hours when commuters are entering the metropolitan areas and other beams have higher usage during evening hours when commuters are exiting the metropolitan area. Still other beams may have higher usage either during business hours or after business hours. FIG. 6 illustrates an alternative display which may be selected by the operator of the system. This display illustrates the number of minutes during a 24-hour period that a particular channel communicated on each of the beams or directional antennas. FIG. 7 illustrates the amount of time that each channel communicated on a particular beam during a 24-hour period.

FIGS. 5–7 are provided for illustrative purposes only. The time period over which a display is generated may be selected by the operator for example to be 24-hour hours as illustrated or other time periods as desired to provide the operator of the system with the desired information.

As mentioned above, the information provided by the traffic distribution system of the invention may be used by the network operator to accurately determine the call usage for each beam of the system. Therefore, the network operator is provided with an accurate indication of the usage of the base site on an azimuthal basis during a selected time period. Therefore, the network operator can analyze the traffic changes over a selected time period, such as over the course of a day, week, month, or any other desired time period. Additionally, the network operator can use the information to determine for example where more capacity is needed for the selection of future base sites.

The traffic distribution information can also be used for improved control of the base site equipment. For example, referring to FIG. 4, the memory 300 within the micro-controller 267 will contain information for the corresponding radio channel units of the particular azimuthal directions or beams which the radio channel unit has utilized for communications. When the radio channel unit is off the air, i.e., when the radio channel unit is not communicating with a mobile unit, the traffic distribution information stored in the memory 300 is used to determine the position of the transmit switch 917. The system tries to predict which beam the next call will come up on based on the information stored in the memory. Therefore, the transmit switch 917 is directed to interconnect the radio channel unit with the antenna beam which was the most used beam during a previous time period, such as one hour.

As mentioned above, traffic distribution information is updated for each radio channel unit at a selected interval, such as 16.5 milliseconds, whenever the transmit switch corresponding to the radio channel unit has a transmit detect signal present on the signal line 315 provide to the micro-controller 267. The memory 300 stores one hour's worth of data for each radio channel unit in the corresponding control group. The supervisory micro-controller 350 polls the memory unit 300 at a selected interval, such as an hourly interval, to download the traffic distribution information from the memory 300 of each micro-controller 267 into a central memory 353 within the supervisory micro-controller 350. The memory 353 within the supervisory micro-controller 350 also stores a selected interval of information, such as seven days worth of information for all of the beams and all of the radio channel units.

Although the invention has been described herein with respect to exemplary embodiments thereof, it will be understood by those skilled in the art that the foregoing and various other changes, omissions and additions may be made therein and thereto without department from the spirit and scope of the present invention.

What is claimed is:

1. A land mobile radio system, comprising:
   a plurality of radio channel units each having a transmit section for transmission of RF signals;
   a plurality of antenna means;
   control system means for dynamically connecting said transmit section of each one of said plurality of radio channel units with any one of said plurality of antenna means; and
   traffic distribution monitoring means for storing traffic distribution information indicative of the amount of usage of each one of said plurality of antenna means by each one of said plurality of radio channel units for the transmission of RF signals.

2. A land mobile radio system according to claim 1, wherein said traffic distribution monitoring means is responsive to the transmission of RF signals provided by said transmit section of a respective radio channel unit on one of said plurality of antenna means for storing traffic distribution information for said respective radio channel unit.

3. A land mobile radio system according to claim 2, wherein said control means dynamically connects said transmit section of said respective radio channel unit with one of said plurality of antenna means which, on average during a sampling period, is best suited for transmitting RF signals at the operating frequency of said respective radio channel unit.

4. A land mobile radio system according to claim 1, wherein said control system means includes a plurality of transmit switches each connected to a corresponding radio channel unit, said control system controlling each transmit switch for dynamically connecting said transmit section of said corresponding radio channel unit with any one of said plurality of antenna means.

5. A land mobile radio system according to claim 4, wherein each transmit switch is responsive to RF signals provided by said transmit section of said corresponding radio channel unit for providing a transmit detect signal, and wherein said traffic distribution monitoring means is responsive to said transmit detect signal for storing said traffic distribution information for said corresponding radio channel unit.

6. A land mobile radio system according to claim 5, further comprising switch control means responsive to the absence of said transmit detect signal from said transmit switch connected to said corresponding radio channel unit and to said traffic distribution information for said corresponding radio channel unit for determining an idle position of said transmit switch connected to said corresponding radio channel unit, said idle position being indicative of a next expected position of said transmit switch connected to said corresponding radio channel unit.

7. A land mobile radio system according to claim 6, wherein said next expected position of said transmit switch connected to said corresponding radio channel unit is determined based upon the antenna means having the greatest amount of usage for said corresponding radio channel unit.

8. A land mobile radio system according to claim 1, further comprising at least one memory means each associated with at least one radio channel unit for storing said traffic distribution information.

9. A land mobile radio system according to claim 1, further comprising supervisory control means having a system memory which is periodically updated with said traffic distribution information for all of said antenna means and for all of said radio channel units.

10. A land mobile radio system according to claim 1, wherein each antenna means provides coverage in a selected azimuthal direction, and the number and beam width of each antenna means are selected and arranged to provide 360° of coverage for the base site, and wherein said traffic distribution information is indicative of the amount of time said plurality of radio channel units utilize each said selected azimuthal direction.

11. A land mobile radio system according to claim 10, wherein each antenna means is a beam of a multi-beam phase array antenna system, each beam acting as a separate signal port for the reception or transmission of radio frequency energy in said selected azimuthal direction.

12. A land mobile radio system according to claim 10, wherein each antenna means is an individual antenna for the reception or transmission of radio frequency energy in said selected azimuthal direction.

13. A land mobile radio system according to claim 1, further comprising display means for displaying said traffic distribution information.

* * * * *

UNITED STATES PATENT AND TRADEMARK OFFICE
CERTIFICATE OF CORRECTION

PATENT NO. : 5,913,177
DATED : June 15, 1999
INVENTOR(S) : Meredith, et. al.

It is certified that error appears in the above-identified patent and that said Letters Patent is hereby corrected as shown below:

Title page, item [57], Abstract:

At the end of the abstract, please add,
--The traffic distribution monitor is responsive to a transmit detect signal provided by a transmit switch connected to the radio channel unit for determining that the radio channel unit is communicating with a mobile radio unit, and in response to the transmit detect signal, information is stored in the memory associated with the radio channel unit. The traffic distribution information may be used for determining the position of a transmit switch when an associated radio channel unit is not communicating with a mobile radio unit.--

Signed and Sealed this

Fourteenth Day of November, 2000

Attest:

Q. TODD DICKINSON

*Attesting Officer*   *Director of Patents and Trademarks*